United States Patent
Ziegelmeyer

(10) Patent No.: US 10,335,864 B2
(45) Date of Patent: Jul. 2, 2019

(54) CLAMPING APPARATUS

(71) Applicant: Westinghouse Electric Company GmbH, Mannheim (DE)

(72) Inventor: Fritz Ziegelmeyer, Bad Schönborn (DE)

(73) Assignee: Westinghouse Electric Germany GmbH, Mannheim (DE)

( * ) Notice: Subject to any disclaimer, the term of this patent is extended or adjusted under 35 U.S.C. 154(b) by 106 days.

(21) Appl. No.: 15/497,048

(22) Filed: Apr. 25, 2017

(65) Prior Publication Data

US 2017/0304907 A1 Oct. 26, 2017

(30) Foreign Application Priority Data

Apr. 26, 2016 (DE) .......................... 10 2016 005 373

(51) Int. Cl.
| | |
|---|---|
| *B23B 31/40* | (2006.01) |
| *B25B 5/06* | (2006.01) |
| *B25B 5/08* | (2006.01) |

(52) U.S. Cl.
CPC ............ *B23B 31/402* (2013.01); *B25B 5/061* (2013.01); *B25B 5/087* (2013.01); *B23B 2231/14* (2013.01); *B23B 2270/48* (2013.01)

(58) Field of Classification Search
CPC ....... B25B 5/061; B25B 5/007; B23B 31/402; B23B 2231/14; B23B 2270/48; B23B 31/404; B23B 31/4053; B23B 31/4026; B23B 31/406; B23B 31/4073; Y10T 279/1045

USPC ...................... 279/2.02, 2.06, 4.09, 137, 141
See application file for complete search history.

(56) References Cited

U.S. PATENT DOCUMENTS

| | | | | |
|---|---|---|---|---|
| 1,427,155 | A | * | 8/1922 | Haven ..................... B23B 31/06 269/7 |
| 2,656,190 | A | * | 10/1953 | Towle ................... B24B 45/006 279/2.03 |
| 2,970,843 | A | * | 2/1961 | Bourguignon ...... B23B 31/4033 279/145 |

(Continued)

FOREIGN PATENT DOCUMENTS

| | | |
|---|---|---|
| DE | 29500115.1 | 4/1995 |
| EP | 2253419 | 12/2012 |

*Primary Examiner* — Sunil K Singh
*Assistant Examiner* — Paul M Janeski
(74) *Attorney, Agent, or Firm* — Katterle Nupp LLC; Paul Katterle; Robert Nupp

(57) ABSTRACT

The disclosure relates to a clamping apparatus for fixing in a recess of a component and for holding a workpiece carrier against the component. The clamping apparatus includes a housing for attachment to the workpiece carrier and a clamping sleeve for insertion into the recess. A clamping mandrel is at least partially disposed inside the clamping sleeve. The clamping mandrel is movable relative to the clamping sleeve between a release position and a clamp position. When the clamping sleeve is inserted into the recess and the clamping mandrel is in the clamp position, the clamping sleeve is braced within the recess by a holding force so as to be in a clamped position. When the clamping sleeve is in the clamped position, the housing is movable relative to the clamping mandrel, which permits the housing to move the workpiece carrier into contact with the component and apply a bearing force thereagainst.

12 Claims, 3 Drawing Sheets

(56) References Cited

U.S. PATENT DOCUMENTS

| | | | | |
|---|---|---|---|---|
| 3,697,092 A | * | 10/1972 | Anthony | B23B 31/4066 |
| | | | | 279/157 |
| 3,909,021 A | * | 9/1975 | Morawski | B23B 31/4033 |
| | | | | 279/156 |
| 4,201,394 A | * | 5/1980 | Morawski | B23B 31/4033 |
| | | | | 242/573 |
| 4,391,451 A | * | 7/1983 | Secor | B23B 31/402 |
| | | | | 279/2.09 |
| 5,133,565 A | * | 7/1992 | Schmidt | B23B 31/4066 |
| | | | | 279/2.04 |
| 8,220,114 B2 | | 7/2012 | Matzat et al. | |
| 8,246,029 B2 | | 8/2012 | Kawakami | |
| 2005/0121846 A1 | | 6/2005 | Kawakami | |

\* cited by examiner

CLAMPING APPARATUS

CROSS-REFERENCE TO RELATED APPLICATION(S)

This application claims priority under 35 U.S.C. § 119 to German Patent Application No. 10 2016 005 373.9, filed on Apr. 26, 2016, which is herein incorporated by reference.

TECHNICAL FIELD

This disclosure relates to a clamping apparatus for fixing in a recess with a clamping sleeve which is connected to a structural element, it being possible for a clamping mandrel to be moved relative to the clamping sleeve, the structural element being guided at least partially in a housing, it being possible for the component to be attached on that side of the housing which faces towards the recess, it being possible for the housing to be moved relative to the clamping mandrel in the case of the clamping sleeve which is situated in the clamped position.

BACKGROUND

DE29500115U1 has disclosed a clamping element, by way of which a load can be fixed in a bore of a component. To this end, a plurality of part shells which are held together by way of O-rings interact with a clamping element. By means of a disc spring assembly, the clamping element is pressed into the part shells for bracing purposes and in this way braces said part shells against the inner wall of the bore with a constant force. The load which is attached to the clamping element is as a rule at a certain spacing from the component, however, after the bracing action. After the bracing action, the load (as a rule, a holder or a holding plate for a mobile machine) is moved up to the component by means of a hydraulically actuated mechanism. This ensures a complete contact between the load and the component. In this way, the effect of the vibrations which are caused by way of the mobile machine on the bracing action is to be reduced.

It is a disadvantage in said prior art that, during the positioning of the clamping element in the bore, the centring action is achieved only with a comparatively great play. In addition, the part shells of the clamping sleeve have to be of stable configuration on account of the selected construction, in order that the respectively acting forces of the bracing action can be introduced into the clamping element. This also leads, inter alia, to a corresponding weight of the clamping element itself. The weight of the disc spring assembly is also a significant proportion of the overall weight. Solely the disc spring assembly namely applies the constant forces for bracing and will have a corresponding mass. A typical weight for a clamping element in accordance with said prior art is at least 800 g. This comparatively high weight also has a disadvantageous effect on the bracing action.

If a clamping element of this type is used in nuclear installations which are subject to radiation exposure, a correspondingly great amount of material is also subjected to the radiation and is therefore contaminated by radiation. Clamping elements of this type are thus used, for example, in the case of repair work on heat exchanger tubes in nuclear power stations. It can occur, moreover, that the part shells are contaminated during use. The holding force between the component and the clamping element is then reduced. The clamping element then has to be dismantled and the part shells have to be cleaned correspondingly, which is time-consuming and likewise leads to a correspondingly higher radiation exposure. The radiation exposure of the work which is carried out is subject to checks and is therefore measured.

Proceeding from said prior art, this disclosure describes a clamping apparatus for fixing in a recess, the holding force of which clamping apparatus can be set during operation, and in the case of which clamping apparatus the effect of vibrations on the bracing action is reduced.

SUMMARY

A clamping apparatus is provided for fixing in a recess of a component and for holding a workpiece carrier against the component. The clamping apparatus includes a housing for attachment to the workpiece carrier and a clamping sleeve for insertion into the recess. The clamping sleeve is connected to the housing. A clamping mandrel is at least partially disposed inside the clamping sleeve. The clamping mandrel is movable relative to the clamping sleeve between a release position and a clamp position. When the clamping sleeve is inserted into the recess and the clamping mandrel is in the clamp position, the clamping sleeve is braced within the recess by a holding force so as to be in a clamped position. When the clamping sleeve is in the clamped position, the housing is movable relative to the clamping mandrel. A first connection is provided for supplying a first pressure medium that moves the clamping mandrel to the clamp position. The holding force is determined by the pressure of the first pressure medium. A second connection is provided for supplying a second pressure medium that moves the housing relative to the clamping mandrel when the clamping sleeve is in the clamped position. When the housing is attached to the workpiece carrier, the movement of the housing relative to the clamping mandrel causes the housing to move the workpiece carrier into contact with the component and apply a bearing force thereagainst. The bearing force is determined by the pressure of the second pressure medium. Regulating devices are provided for controlling the pressures of the first and second pressure mediums such that the holding force is greater than the bearing force.

BRIEF DESCRIPTION OF THE DRAWINGS

The disclosure, further embodiments and further advantages are to be described in greater detail using the exemplary embodiments which are shown in the drawings, in which.

DETAILED DESCRIPTION OF ILLUSTRATIVE EMBODIMENTS

Figure 1:
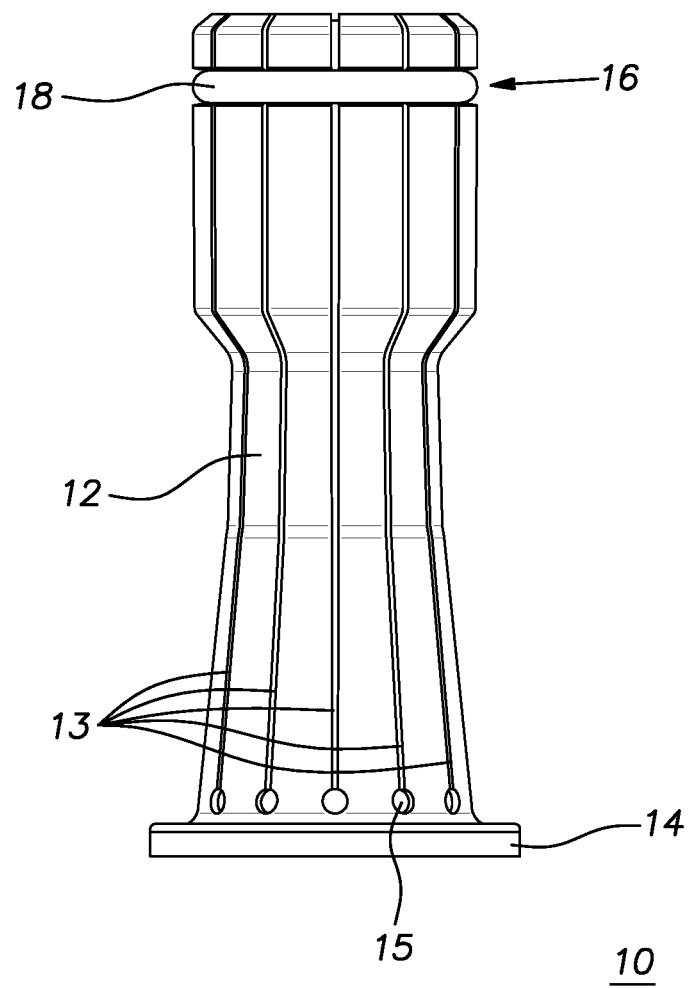
FIG. 1 shows one example of an expanding sleeve according to the disclosure.

This disclosure describes a clamping apparatus of the type mentioned at the outset. The said clamping apparatus is distinguished by the fact that the clamping mandrel can be moved relative to the clamping sleeve by means of a first pressure medium for bracing purposes, and that the holding force of the bracing action can be set by way of a pressure in the first pressure medium. It is advantageously achieved in this way that the holding force is no longer constant, but rather can be increased, for example, if required. If it is determined namely during operation that there is an indication that the clamping apparatus is "working loose due to vibration", the operator then has the possibility of also increasing the holding force correspondingly by way of simple setting or increasing of the pressure in the first pressure medium. As a consequence, the clamping apparatus is braced in the recess with a higher holding force. In addition, in each case one clamping sleeve which is adapted to the relevant recess has to be used for recesses of different dimensions. The necessary holding forces also change correspondingly. In an advantageously simple way, the clamping apparatus according to the disclosure can be adapted to the said changed requirement by way of corresponding setting of the pressure in the pressure medium. The installation of another spring assembly which has been required up to now is dispensed with, since a spring assembly is no longer required for this task. The clamping apparatus overall is correspondingly lighter with the advantage that the mass which is excited by way of the vibration during operation is advantageously reduced.

In addition to the advantage of the reduced mass, the component can be attached on that side of the housing which points towards the recess, which ensures that the component makes contact with, for example, the tube bottom, into which the recess for fixing is introduced. In this way, the effect of vibrations, for example of a mobile machine which is fastened to the clamping apparatus by way of the component, is reduced further.

One advantageous development of the clamping apparatus according to the disclosure is distinguished by the fact that the housing which carries the component can be moved relative to the clamping mandrel with the aid of a second pressure medium in the case of the clamping sleeve which is situated in the clamped position, that the force, with which the workpiece carrier bears against the component, can be regulated by way of a pressure in the second pressure medium, and that the pressures in the first and in the second pressure medium are regulated in such a way that the holding force is greater than the force for carrying out the relative movement between the housing and the clamping mandrel.

As a result, the spacing is reduced between the component and, for example, a wall, in which a bore is situated, in which the clamping apparatus is to be braced. In this way, the forces and vibrations which are introduced by the load during operation advantageously have only relatively small effects on the clamping apparatus and its holding force.

One development according to the disclosure of the clamping apparatus provides that there are force and/or pressure measuring apparatuses, by way of which the holding force can be calculated, and that the holding force can be regulated by way of a pressure increase or pressure reduction.

This achieves a situation where pressure adaptations and therefore also the adaptation of the holding force or the force for the relative movement between the load and the clamping mandrel can be adapted automatically to a defined operating condition, that is to say can be regulated. The manual monitoring and setting of the pressure or the pressures in the pressure media are therefore also dispensed with. A possible error source is avoided accordingly.

A further advantageous refinement of the clamping sleeve provides that the clamping sleeve is an expanding sleeve which is configured in one piece, and that the expanding sleeve has at least two segment tongues.

The single-piece embodiment of the clamping sleeve as an expanding sleeve achieves a situation where the stability of the component is increased. In addition, the expanding sleeve can be operated with a higher holding force in comparison with previous clamping sleeves. In addition, the mass of the clamping apparatus can also advantageously be reduced by way of the said embodiment according to the disclosure.

A further advantage consists in that a play which has always been present up to now between the part shells of a clamping element is dispensed with completely. For instance, a typical accuracy which it has been possible to achieve up to now for the centring action in the recess, in which the clamping element according to the prior art was introduced, has been greater than ±0.3 mm. Accuracies of better than ±0.15 mm can readily be achieved by way of the single-piece configuration of the expanding sleeve. Since the clamping apparatus according to the disclosure is used, in particular, in the case of tasks, in which it comes down to the accuracy of the positioning or centring action, this is substantial progress with respect to the clamping elements which have been known up to now.

One advantageous development of the subject matter of the disclosure relates to a clamping apparatus which is distinguished by the fact that the segment tongues have a wall thickness and/or a wall thickness profile such that a spring action of the segment tongues is achieved.

As a result of the configuration according to the disclosure of the expanding sleeve, the segment tongues have a comparatively small wall thickness. Firstly, an advantageous weight reduction is achieved in this way, and secondly a spring action can be achieved along the longitudinal extent of the expanding sleeve, which spring action is made possible by way of the segment tongues which are resilient in a sprung manner. As a result, it is also possible that the segment tongues are adapted particularly simply to the contour of the recess, into which the clamping apparatus is to be braced. It can namely occur that there are still dirt particles or other obstacles in the recess. In addition, this achieves a situation where the forces which act during bracing in the region of the expanding sleeve are distributed homogeneously over the segment tongues and therefore act symmetrically on the inner wall of the recess. The effect of the holding forces is improved overall.

One development of the clamping apparatus provides that a contact area between the clamping mandrel and the expanding sleeve is of conical configuration, and that the angle of the cone is selected in such a way that there is just about no self-locking action between the clamping mandrel and the expanding sleeve.

A configuration of this type of the cones avoids the clamping mandrel and the expanding sleeve being connected to one another in such a way that a release is possible only with an additional expenditure of force. As a result, the construction is simplified and a disadvantageous possible operating state of the clamping apparatus is avoided. In addition, the ratio between a force which acts in the longitudinal direction of the clamping mandrel and a radial clamping force which results from the said force is influenced in an advantageous way. The simplified construction likewise achieves a weight reduction of the clamping apparatus according to the disclosure.

The further refinement of the subject matter of the disclosure is achieved by the expanding sleeve being manufactured from a steel with a tensile strength of at least 1800 N/mm$^2$ and a 0.2 yield strength of at least 1600 N/mm$^2$, and by the steel having a hardness of at least 52 HRC (hardness in accordance with the Rockwell C method).

The weight of the expanding sleeve and therefore of the clamping apparatus overall is advantageously reduced further by way of the said selection of the material for manufacturing an expanding sleeve.

According to a further embodiment of the clamping apparatus, the segment tongues are formed by way of separating slots in the direction of the longitudinal extent of the expanding sleeve, and a predefinable spring travel of the segment tongues can be achieved by way of the length of the separating slots.

This achieves a situation in a particularly simple way where the desired spring action can be achieved solely by way of the length of the separating slots. Thus, for example, different spring travels and therefore also spring forces can be set in one and the same clamping sleeve shape and can therefore be adapted in a particularly simple way to every possible use.

One advantageous development of the clamping apparatus provides that the clamping mandrel is conical at its end which points towards the expanding sleeve, that the expanding sleeve has a conical region which is adapted to the conical part of the clamping mandrel, and that the angles of the cones are selected in such a way that a contact area between the clamping mandrel and the expanding sleeve is greatest in this region in the clamped state.

The cones therefore first of all have a slightly different angle in the relieved state. As soon as the clamping mandrel moves into the expanding sleeve and therefore braces the expanding sleeve against the recess and the corresponding clamping action is achieved as a result, the contact area between the clamping mandrel and the expanding sleeve is greatest in this region according to the disclosure. As a result, the wear on the contact area is advantageously minimized, the distribution of the holding forces is optimized, and higher holding forces overall are made possible.

FIG. 1 shows a lateral view of one preferred embodiment of an expanding sleeve 10 according to the disclosure. A number of segment tongues 12 can be seen here which (at the bottom in this view) merge into a bottom part 14. The expanding sleeve 10 is configured in one piece. This achieves a situation where the forces which act on the segment tongues 12 during the bracing action can be introduced into the bottom part 14 in a particularly simple way. In addition, each segment tongue 12 is fixed without play at its position which is predefined by way of the construction. The expanding sleeve 10 has twelve segment tongues 12 in the selected example. It has been proven namely that a particularly favourable clamping action with a simultaneously satisfactory positioning capability of the expanding sleeve 10 can be achieved by way of twelve segment tongues 12. A clamping action is fundamentally already achieved by way of only two segment elements, however, with the result that any number of segment elements above the number 2 can be selected readily within the concept of the disclosure. The further figures show how the clamping action is achieved precisely. A groove 16, in which an O-ring 18 is arranged, is shown at the top in the said figure. The said O-ring 18 is provided so that the segment tongues 12 are situated in a defined position during the assembly and in the stress-free state of the expanding sleeve 10.

In the example which is shown, the expanding sleeve 10 is turned completely from one piece. A steel with a comparatively high toughness is selected as material and is provided with an increased hardness by way of a heat treatment. The wall thickness of the segment tongues 12 is selected in such a way that the individual segment tongues 12 are resilient in a sprung manner within their technical design, without a permanent deformation taking place. Each segment tongue 12 is produced by way of corresponding cuts 13 in the direction of the longitudinal extent of the expanding sleeve 10, the cuts 13 reaching as far as the vicinity of the bottom 14. The cut bottom is widened by way of a bore 15 in the said vicinity. This achieves a situation where the material stresses are reduced in the said region.

Figure 2:
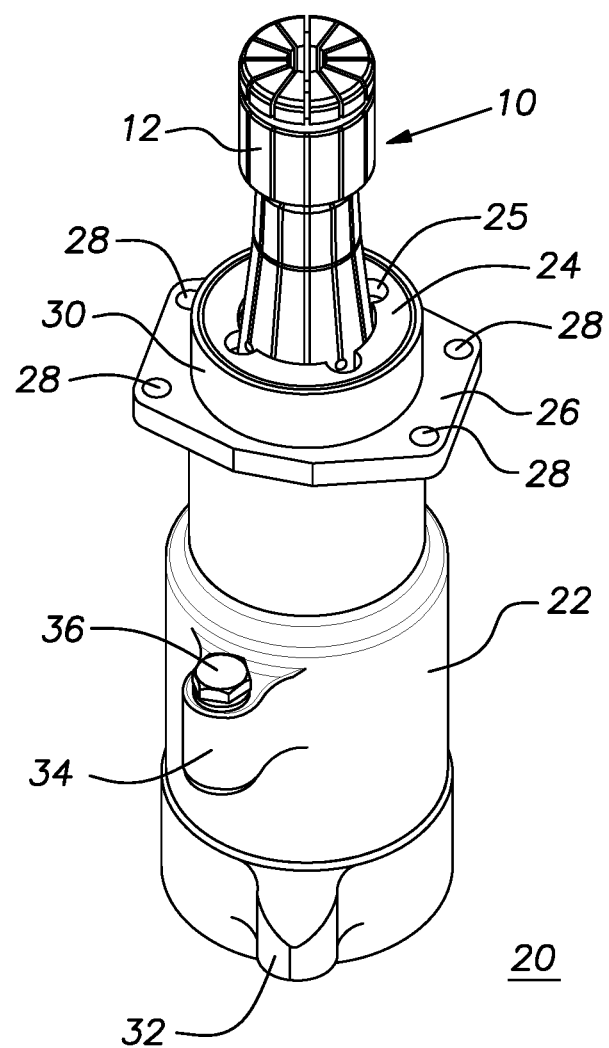
FIG. 2 shows a view of a clamping apparatus according to the disclosure.

FIG. 2 shows a view from the outside of a preassembled clamping apparatus 20 according to the disclosure. Here, the clamping sleeve 10 is assembled in a housing 22 which is provided at the top in this view with a cover screw 24, through which the segment tongues 12 engage. The recesses 25 in the cover screw 24 are provided for assembly and dismantling of the cover screw 24. A first housing region 30 is of cylindrical configuration in the upper region of the housing 22 between a flange plate 26 which has a number of bores 28 and the outer side of the cover screw 24. The said part of the housing 22 is intended, for example, for receiving a tool carrier (not shown in this figure) which has, for example, a bore which is adapted to the diameter of the first housing region 30, with the result that it can be moved over the segment tongues 12 and over the first housing region 30 for assembly purposes and utilizes the first flange plate 26 as an assembly stop. In addition, the tool carrier can then be connected fixedly to the flange plate 26 and positioned in a stationary manner, for example, by way of a screw connection and using the bores 28.

In this illustration, a first moulded projection 32 is shown in the lower region of the housing 22 and a second moulded projection 34 is shown in the middle region of the housing 22, into which second moulded projection 34 a bleed screw 36 is screwed. The latter serves as a possibility for bleeding a pressure medium, a hydraulic oil in the selected example which is guided via a pressure line (not shown) into a connector nozzle (not visible in this figure). Further functions will be explained in greater detail in the description with respect to FIG. 3.

Figure 3:
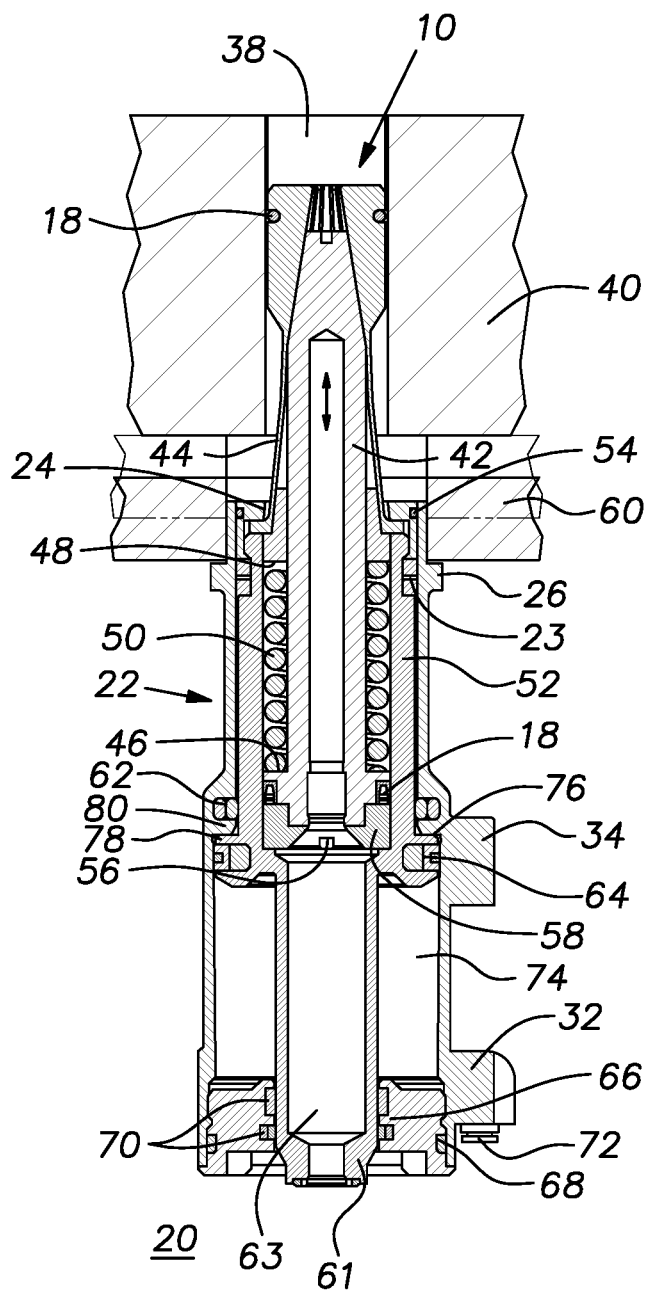
FIG. 3 shows a sectional view through the clamping apparatus according to the disclosure.

FIG. 3 shows a sectional view through the clamping apparatus 20 according to the disclosure which is braced in a further recess 38 of a component 40 and is therefore fixed or anchored in a defined position. The further recess 38 might be, for example, a hole or a bore in a bottom, a heat exchanger bottom, a wall or ceiling or else a tube, for example a tube of a heat exchanger. The effect of the bracing action and therefore of the anchoring action of the clamping apparatus 20 in the recess 38 is achieved by way of interaction of the expanding sleeve 10 with a clamping mandrel 42 which can be moved relative to the expanding sleeve 10 in the directions of a double arrow 44 in a clamped or released position. The clamping mandrel 42 is shown in its released position. The O-ring 18 ensures that the segment tongues 12 of the expanding sleeve 10 always bear against the clamping mandrel 42 in this state. Here, the clamping mandrel 42 tapers conically at its end which points towards the expanding sleeve 10. The contact areas between the expanding sleeve 10 and the conical end of the clamping mandrel 42 are adapted to one another, the angle of the cone being selected in such a way that there is just about no self-locking action between the clamping mandrel 42 and the expanding sleeve 10. If the cone angle is selected as described, the clamping mandrel 42 will automatically move in the direction out of the expanding sleeve 10 in the released state of the clamping apparatus 20. In addition, the outer face of the expanding sleeve 10 is adapted in the region, in which the expanding sleeve 10 is braced with the component 40, to the diameter of the further recess 38 in such a way that there is a greatest possible contact area in the braced state. In the example which is shown, the said contact area is the lateral surface of a cylinder. The wear of the relevant contact area is reduced in this way. In the region of the contact area, the expanding sleeve 10 is provided with a coating which has, for example, a defined granularity, or at any rate is designed in such a way that the friction is increased at the contact area between the further recess 38 and the expanding sleeve 10. The clamping action is improved there in this way.

A spring 50 is arranged between a shoulder 46 of the clamping mandrel 42 and a guide bushing 48, it being possible for the clamping mandrel 42 to be moved in the guide bushing 48 in a sliding manner. The sliding of the clamping mandrel 42 out of the expanding sleeve 10 is assisted by way of the spring 50. This is not absolutely necessary, but the sliding out action is improved by way of the spring 50, and the clamping mandrel 42 reaches a structurally predefined position in the released state of the clamping apparatus 20 in a particularly simple way. The expanding sleeve 10 is fixed between the cover screw 24 and the guide bushing 48. The cover screw 24 is screwed to an inner part 52 and is sealed against the housing 22 by way of a sealing ring 54 counter to the action of dirt from the outside, that is to say is sealed from the operating environment. A guide part 58 is connected to the clamping mandrel 42 by way of a screw 56 at that end of the said clamping mandrel 42 which faces away from the expanding sleeve 10, and a cylinder/piston arrangement is produced overall in this way, in which the spring 50 is compressed counter to its spring force by way of corresponding loading of the end side of the guide part 58 with a pressure medium, and in this way the clamping apparatus 20 is moved into its clamped position. A corresponding pressure line for the pressure-conducting medium can be connected to a first connector nozzle 61 of the inner part 52. The inner part 52 forms a cylindrical pressure space 63 in this region, with the result that the pressure which prevails at the first connector nozzle 61 also acts on the screw 56 and/or the guide part 58, and a corresponding action of force on the clamping mandrel 42 is achieved in this way. In the case of a reduction or elimination of a sufficiently high pressure of the pressure-conducting medium, for example a hydraulic oil or water, the clamping mandrel 42 will move out of the expanding sleeve 10 in a manner which is assisted by way of the spring force of the spring 50, and will convey a part of the pressure-conducting medium back into the pressure line. The clamping apparatus 20 is accordingly now in the recess 38 in its released position, that is to say relieved and loose in the recess 38.

The clamping apparatus 20 has a further function which is shown using a workpiece carrier 60 which is connected to the flange plate 26. Together with the housing 22, the inner part 52 forms a further cylinder/piston arrangement which is sealed against exit of a pressure medium by way of the sealing ring 54 and a sealing system 62 and a further sealing system 64. A guide band 23 is inserted between the housing 22 and the inner part 52, which guide band 23 ensures secure positioning of the two components during their relative movement. In addition, the inner part 52 engages over the spring element 50 and in this way acts as the holder of the latter and as a further guide for the relative movement between the inner part 52 and the housing 22. In this figure, a cover 66 is screwed into the housing 22 at the lower end of the latter and is sealed by way of a sealing element 68 between the housing 22 and the cover 66. In addition, there is a further sealing element 70 on the cover 66, which further sealing element 70 seals the cover 66 against the inner part 52. Together with the housing 22 and the inner part 52, the cover 66 forms an annular space 74 which can be loaded by way of a second connector nozzle 72 with a pressure-conducting medium, for example compressed air. The connecting line between the second connector nozzle 72 and the annular space 74 cannot be seen in this figure, since the section through the clamping apparatus 20 is routed in this region merely through the wall of the first moulded projection 32. In a corresponding manner, a further pressure-conducting medium is guided via a further connector nozzle (not shown in this figure) via the second moulded projection 34 to a second annular space 76. The second annular space 76 is shown in its smallest possible extent in this figure, namely such that a collar 78 of the inner part 52 bears against a stop 80 of the housing 22. This is achieved by the pressure conditions in the first annular space 74 and in the second annular space 76 being selected in such a way that the forces which act as a result move the inner part 52 as far as the stop 80.

The operation of the bracing and the release of the clamping apparatus 20 is to be explained in greater detail in the following text. To this end, the clamping apparatus 20 is connected by way of the first connector nozzle 61 and by way of the further connector nozzle (not shown) in the second moulded projection 34 to in each case one hydraulic line and the second connector nozzle 72 is connected to a compressed air line. The pressures in the hydraulic lines and the compressed air line can be set separately for each line, the air in the compressed air line being set to a predefined constant pressure, and the said constant pressure also being set accordingly in the annular space 74. The pressures in the hydraulic lines can be regulated in each case separately. For this purpose, there are one or more regulating devices which are not shown in this figure, however, but are set up to set or to regulate each individual pressure separately. The pressure regulating devices are connected to the hydraulic lines or compressed air line, with the result that the regulated pressure also acts in the clamping apparatus 20. Here, the pressure regulating devices can have a dedicated pressure supply, for example a hydraulic pump, a hydraulic accumulator, a compressed air supply, a compressed air cylinder or the like, and generally known control and regulating members for regulating the relevant pressure. In order to bring the clamping apparatus 20 into a first state, namely the released state, a predefined air pressure is applied to the second connector nozzle 72, the hydraulic lines still being pressureless. This ensures that the collar 78 of the inner part 52 bears against the stop 80 of the housing 22 and the annular space 74 has its maximum extent in this way. By way of the spring forces of the spring 50 (here, a helical spring), the clamping mandrel 42 is moved out of the expanding sleeve 10, in so far as this is structurally specified. This is assisted by way of the O-ring 18 which additionally holds the segment tongues 12 of the expanding sleeve 10 together in a smallest possible diameter. In this way, a further force is applied in the direction of the extension of the clamping mandrel 42. The clamping apparatus 20 is therefore in a released state, the first state or else basic state. The clamping apparatus 20 is then moved into the recess 38. In order to bring the clamping apparatus 20 into a second state, the clamped state, the hydraulic pressure in the line to the first connector nozzle 61 is increased. Between the guide part 58 and the first connector nozzle 61, the inner part 52 forms a cylindrical space 63 which is filled with the pressure-conducting medium during the operation of the clamping apparatus 20 and thus loads the guide part 58 with the hydraulic pressure. The pressure is set to be so high at this point that the resulting holding force via the expanding sleeve 10 into the wall of the recess 38 is higher, in particular is substantially higher, than a force which is applied by way of the hydraulic pressure in the line to the further connector nozzle in the first moulded projection 34. The said force presses the assembled workpiece carrier 60 against the component 40 by way of widening of the second annular space 76. This ensures that there is no spacing between the workpiece carrier 60 and the component 40.

By way of the correspondingly high pressure at the first connector nozzle 61, the guide part 58 will move counter to the spring forces of the spring 50 and the spring 50 is compressed. In this way, the clamping mandrel 42 is moved into the expanding sleeve 10. The clamping apparatus 20 is therefore in a relieved state, the second state or else operating state. After a defined operating time, it can occur, for example as a result of vibrations of the workpiece carrier 60, that the expanding sleeve 10 is loosened in the further recess 38. In order to counteract this effect, it is provided that the holding force of the expanding sleeve 10 in the further recess 38 is increased by way of an increase of the pressure in the pressure space 63. Here, the pressure increase can take place manually after the effect is detected, but it can also take place automatically and therefore in a regulated manner, for example if a defined vibration strength is reached, or by the different forces, holding forces, forces resulting from the vibrating, etc. being measured or calculated.

The accuracy and the stability of the clamping apparatus 20 can be influenced by way of the ratio of the length of the clamping mandrel 42 to the length of the free spring travel of the spring 50. The greater this ratio is selected to be, the more mechanically stable the clamping apparatus 20 will be, and accordingly the accuracy of the clamping apparatus 20 will increase.

A predefined air pressure is set continuously via one of the compressed air lines at the second connector nozzle 72. It is ensured in this way that the inner part 52 is moved relative to the housing 22 solely by way of a regulation of the hydraulic pressure in the second annular space 76, which hydraulic pressure can be set by way of a further hydraulic line via the further connector nozzle. It is possible as a result that a workpiece carrier 60 which is possibly still at a small spacing from the component 40 after the expanding sleeve 10 has moved into the further recess 38 is moved against the said component 40, with the result that it bears completely against it. This state of complete bearing of the workpiece carrier 60 against the component 40 is to be shown by way of the dashed lines which show the outline of the workpiece carrier 60 after bearing against the component 40. If the pressure in the second annular space 76 is increased further, the forces also increase which bring about the relative movement between the inner part 52 and the housing 22.

If the clamping apparatus 20 is to be removed from the further recess 38 again, the said clamping apparatus 20 is to be released by the above-described operating steps being performed in reverse order.

This also achieves a situation where the complete clamping apparatus can be moved into its braced or released states by way of the regulation of only two hydraulic air lines, namely those which are connected at the first connector nozzle 61 and at the further connector nozzle.

It is to be understood that the description of the foregoing exemplary embodiment(s) is (are) intended to be only illustrative, rather than exhaustive. Those of ordinary skill will be able to make certain additions, deletions, and/or modifications to the embodiment(s) of the disclosed subject matter without departing from the spirit of the disclosure or its scope.

What is claimed is:

1. Clamping apparatus for fixing in a recess of a component and for holding a workpiece carrier against the component, the clamping apparatus comprising:
   a housing for attachment to the workpiece carrier;
   a clamping sleeve for insertion into the recess, the clamping sleeve being connected to the housing;
   a clamping mandrel at least partially disposed inside the clamping sleeve, the clamping mandrel being movable relative to the clamping sleeve between a release position and a clamp position, wherein when the clamping sleeve is inserted into the recess and the clamping mandrel is in the clamp position, the clamping sleeve is braced within the recess by a holding force so as to be in a clamped position, and wherein when the clamping sleeve is in the clamped position, the housing is movable relative to the clamping mandrel;
   a first connection for supplying a first pressure medium that moves the clamping mandrel to the clamp position, wherein the holding force is determined by the pressure of the first pressure medium; and
   a second connection for supplying a second pressure medium that moves the housing relative to the clamping mandrel when the clamping sleeve is in the clamped position, wherein when the housing is attached to the workpiece carrier, the movement of the housing relative to the clamping mandrel causes the housing to move the workpiece carrier into contact with the component and apply a bearing force thereagainst, and wherein the bearing force is determined by the pressure of the second pressure medium; and
   regulating devices for controlling the pressures of the first and second pressure mediums such that the holding force is greater than the bearing force.

2. Clamping apparatus according to claim 1, further comprising force and/or pressure measuring apparatuses, by way of which the holding force can be calculated, and wherein the holding force can be regulated by the regulating devices by way of increasing or decreasing the pressure of the first pressure medium.

3. Clamping apparatus according to claim 1, wherein the clamping sleeve is an expanding sleeve, which is configured in one piece, and wherein the expanding sleeve has at least two segment tongues.

4. Clamping apparatus according to claim 3, wherein the segment tongues each have a wall thickness and/or a wall thickness profile such that each of the segment tongues has a spring action.

5. Clamping apparatus according to claim 3, wherein contact areas between the clamping mandrel and the expanding sleeve are conical, and in that wherein angles of the conical contact areas are selected such that the configuration of the conical contact areas avoids the clamping mandrel and the expanding sleeve being connected to one another in such a way that a release is possible only with an additional expenditure of force.

6. Clamping apparatus according to claim 3, wherein the expanding sleeve is manufactured from a steel with a tensile strength of at least 1800 N/mm$^2$ and a 0.2 yield strength of at least 1600 N/mm$^2$, and in that the steel has a hardness of at least 52 HRC.

7. Clamping apparatus according to claim 3, wherein the segment tongues are formed by separating slots arranged in the direction of a longitudinal axis of the expanding sleeve, and wherein spring travel of the segment tongues is determined by the length of the separating slots.

8. Clamping apparatus according to claim 1, wherein the clamping mandrel has a conical end located inside the clamping sleeve, wherein the clamping sleeve has an interior conical region which is adapted to the conical end of the clamping mandrel, and wherein the angles of the conical end of the clamping mandrel and the interior conical region of the clamping sleeve are selected such that the area of contact between the clamping mandrel and the expanding sleeve is greatest when the clamping sleeve is in the clamped position.

9. Clamping apparatus according to claim 1, further comprising an inner part disposed in the housing, the inner part defining first and second interior chambers, which are connected, the first interior chamber being located toward the clamping sleeve and the second interior chamber being located away from the clamping sleeve, and wherein the clamping mandrel is partially disposed in the first chamber.

10. Clamping apparatus according to claim 9, wherein the first connection is connected to the second chamber to permit the first pressure medium to flow into the second chamber.

11. Clamping apparatus according to claim 10, further comprising a spring disposed in the first chamber and operable to bias the clamping mandrel toward the release position.

12. Clamping apparatus according to claim 9, wherein the inner part comprises an outer collar that cooperates with the housing to define an annular space therebetween, and wherein the second connection is connected to the annular space to permit the second pressure medium to flow into the annular space.

* * * * *

UNITED STATES PATENT AND TRADEMARK OFFICE
CERTIFICATE OF CORRECTION

PATENT NO. : 10,335,864 B2
APPLICATION NO. : 15/497048
DATED : July 2, 2019
INVENTOR(S) : Fritz Ziegelmeyer Page 1 of 1

It is certified that error appears in the above-identified patent and that said Letters Patent is hereby corrected as shown below:

On the Title Page

In Item (71), under "Applicant", delete "Westinghouse Electric Company GmbH" and insert therefor:
--Westinghouse Electric Germany GmbH--

In the Claims

Column 10, Line 54: delete "in that"

Signed and Sealed this
Tenth Day of September, 2019

Andrei Iancu
*Director of the United States Patent and Trademark Office*